United States Patent [19]

Berchem

[11] Patent Number: 5,271,427

[45] Date of Patent: Dec. 21, 1993

[54] ASSEMBLY FOR THE CONTROL OF PRESSURE AND VOLUME FLOW OF A FLOWABLE MEDIUM

[75] Inventor: Rütger Berchem, Gelsenkirchen, Fed. Rep. of Germany

[73] Assignee: Metalpraecis Berchem + Schaberg Gesellschaft fur Metallformgebung mbH, Gelsenkirchen, Fed. Rep. of Germany

[21] Appl. No.: 963,578

[22] Filed: Oct. 19, 1992

[30] Foreign Application Priority Data

Oct. 19, 1991 [DE] Fed. Rep. of Germany ....... 4134652

[51] Int. Cl.⁵ .............................................. F16L 7/00
[52] U.S. Cl. ............................. 137/375; 251/315 CE; 251/118; 251/315 RC; 137/613; 406/193; 406/195
[58] Field of Search ........................ 251/368, 315, 118; 137/614, 375, 14, 613; 138/39, 44, 45; 239/574, 589, 427.3, 427, 427.5, 267; 406/191, 193, 194, 195

[56] References Cited

U.S. PATENT DOCUMENTS

| | | | |
|---|---|---|---|
| 2,836,199 | 5/1958 | Wilson | 138/45 |
| 2,841,446 | 7/1958 | Trotter | 406/191 |
| 4,566,489 | 2/1986 | Knapp et al. | 137/614 |
| 4,771,803 | 9/1988 | Berchem et al. | 251/368 |
| 5,123,439 | 6/1992 | Powers | 251/368 |

FOREIGN PATENT DOCUMENTS 2177990  2/1987  United Kingdom ............... 406/195

*Primary Examiner*—Martin P. Schwadron
*Attorney, Agent, or Firm*—Herbert Dubno; Yuri Kateshou

[57] ABSTRACT

An assembly of a first expansion stretch, a first throttle, a second throttle and a second expansion stretch have respective metal casings and elements defining the flow paths therein composed of engineered ceramics. The throttle are adjustable and the assembly can be used effectively to control pressure and flow rate of compressible or incompressible fluids which can have solid particles entrained therein.

17 Claims, 3 Drawing Sheets

ASSEMBLY FOR THE CONTROL OF PRESSURE AND VOLUME FLOW OF A FLOWABLE MEDIUM

CROSS REFERENCE TO RELATED APPLICATIONS

This application is related to my commonly owned copending application Ser. No. 07/712,124 now U.S. Pat. No. 5,205,533 issued Apr. 27, 1993 related to one or more of the following patents which were copending with that application or applications copending therewith:

U.S. Pat. No. 5,052,445
U.S. Pat. No. 4,968,004
U.S. Pat. No. 4,995,427
U.S. Pat. No. 4,936,546
U.S. Pat. No. 4,932,432
U.S. Pat. No. 4,771,803
U.S. Pat. No. 4,791,953
U.S. Pat. No. 4,804,207
U.S. Pat. No. 4,795,133.

FIELD OF THE INVENTION

My present invention relates to an assembly for pressure and volume flow control in a flow passage, duct or conduit of a flowable medium, e.g. a compressible medium such as a gas or an incompressible medium such as a liquid and, especially, a medium containing finely divided solids.

BACKGROUND OF THE INVENTION

Control units for regulating pressure or volume flow rate of a compressible or incompressible medium are employed in a variety of applications in process technology. They generally comprise valves or nozzles. The valves can be remotely controlled devices for blocking a flow path or unblocking a flow path for a liquid, gas or vapor, or devices for controlling the flow rate or maintaining constant a pressure.

Depending upon the closing action of the valve member, such valves may differ from one another. Flap-type valves or gate valves close in a direction opposite the flow. Slide valves close in a direction transverse to the flow in a linear displacement of the valve member. Cocks are rotated about an axis perpendicular to the flow direction. The nozzles can differ from case to case as well. They can be venturi nozzles, i.e. nozzles which provide a constriction through which flow is accelerated, diffusers which widen from a small cross section region, or Laval nozzles in which a curved upstream part converges toward a constriction and a downstream part widens away from this constriction also with wall curvature.

In general, these assemblies are connected in control circuits with feedback from sensors of the pressure or volume flow to the controlled elements of the assembly such as the valve members.

When finely divided solids are entrained in the medium, abrasive action in the flow paths of the assembly can cause damage to the walls thereof depending upon the composition and the hardness of the finely divided solids and the velocity of the flowable medium.

To reduce abrasive wear of this type, it is known to provide the flow passage of an engineered ceramic, as described, for example, in at least some of the patents and the application mentioned previously.

An engineered ceramic, as this term is used here, is intended to refer to any of the man-made ceramics which can be of a silicon dioxide and/or aluminum oxide base as well as nitrides and carbides. The following listing is intended to be illustrative of engineered ceramics which may be used alone or in combination, usually in the form of sintered structures: silicon dioxide, aluminum oxide, boron carbide, boron nitride, silicon carbide, silicon nitride, zirconium oxide, nitride or carbide, tungsten oxide, nitride or carbide, titanium oxide, nitride or carbide, magnesium oxide.

Thus in process technology and in metallurgy, where coal, dust ores, finely divided quartz sand and the like are entrained in gas streams, ceramic linings are often provided for the flow passages. The unit of the invention is also intended for these applications.

In flow passages which contain control elements, traversed by a compressible or an incompressible medium, detrimental critical flow conditions can arise, especially when the system operates with high pressure differentials.

The critical flow conditions are gas dynamic or hydrodynamic conditions which can have singularities in the differential equations which define such flows. Because of such singularities, it is not always possible to predict the flow characteristics or to design control units for such flow conditions even with computer design capabilities as they stand at present. In many cases, the differential equations required for such design purposes cannot be ascertained with any precision and may not have solutions when empirical equations are deduced. Critical flow conditions with compressible media are usually associated with flow velocities exceeding the speed of sound and in the case of incompressible media such as liquids, are associated with cavitation and similar effects which generate vapor. Both phenomena are detrimental to the control units or assemblies hitherto employed.

OBJECTS OF THE INVENTION

It is, therefore, the principal object of the present invention to provide an improved assembly or unit which can be used in the applications described for control of pressure and volume flow and which completely satisfies the requirements in the sense that it has long life and yet allows suppression of critical flow states or minimizes the effects thereof.

Another object is to increase the useful life of an assembly for the purposes described.

Still another object of my invention is to provide an improved assembly for controlling pressure and volumetric flow whereby drawbacks of earlier systems are avoided.

SUMMARY OF THE INVENTION

These objects and others which will become apparent hereinafter are attained, in accordance with this invention, in an assembly for controlling pressure and volumetric flow of a compressible or incompressible medium which can entrain finely divided solids therein and which comprises:

a first throttle formed with a respective control member actuatable to vary a flow cross section thereof;

a second throttle downstream of the first throttle and provided with a respective control member to vary a flow cross section of the second throttle;

a first expansion segment upstream of the first throttle along a flow of the medium through the assembly affording a flow cross section enlargement for the flow of the medium; and a second expansion segment downstream of the second throttle along the flow of the medium and affording a flow cross section enlargement for the flow of the medium, at least the first throttle comprising a metal housing and a lining insert in the housing composed of an engineered ceramic, at least one of the control members being composed of an engineered ceramic, the second expansion segment having a flow cross section greater than an upstream cross section of the first throttle.

According to a preferred embodiment of the invention, both the first throttle and the second throttle are provided with elements defining the flow passages and control or valve bodies of engineered ceramics.

The invention is based upon our discovery that, by including expansion stretches in the assembly in the gas dynamic or hydrodynamic sense, even with high pressure differences across the assembly it is possible to adjust the variable throttles so that critical flows can be suppressed in the assembly.

Since the first throttles can be adjusted differently from the second throttles, the positions of the throttles for the various expansion stretch can be readily determined experimentally and empirically in the unit directly or with the aid of sample modeling techniques without any difficulty by an ordinary skilled worker in the art to achieve such suppression of critical states.

Because of the use of engineered ceramics in the flow contacting regions of the throttle and expansion stretches, wear of the elements of the assembly is minimized.

It is indeed surprising that the elimination of critical states as defined applies both to compressible and incompressible flowable medium utilizing the positioning of the elements of the assembly as has been described.

This is particularly surprising since in practice other approaches have been deemed to be required. For example it is known from DE-OS 28 32 497 that compressible media in a critical flow state give rise to detrimental sound generation which requires sound dampers in the form of movable damper walls and thus hollow structures which can vary in volume with yield gas type walls exposed to high internal friction. As a consequence, there is a substantial pressure loss and higher pressure differentials are required so that incompressible media and media which entrain finely divided solids cannot be used without the danger of excess wear and deterioration of the system.

To reduce the blow off pressure of condensate lines, it is known from DE OS 35 08 229, to work with a spiral pipe disposed downstream of the condensate discharge valve and which has a substantially uniform inner cross section. The spiral pipe has a diameter of the flow passage determined by its length. Tests have shown that the objects of the present invention cannot be achieved at high pressure differences especially with media containing finely divided solids with this system.

According to a feature of the invention, both the expansion and stretches and the throttles are provided with metallic casings or housings and inserts of engineered ceramics. The expansion stretches have nozzle shaped housings and nozzle shaped inserts.

So that the units of the assembly can be combined in various ways to establish various combinations for particular purposes, the elements of the assembly or unit, i.e. the throttles and expansion stretches, can be provided with connectors, e.g. flange connections which allow assembly of the elements in various ways. The engineered ceramic elements can be held against the casing under fluid pressure by applying a pressure gradient in the main flow direction. Especially when the flowable medium does not entrain finely divided solids, the ceramic inserts can permit a flow behind the inserts, i.e. between the inserts and the casing to allow pressure equalization across the ceramic inserts and relieve the ceramic inserts from pressure.

For flexibility in the assembly, each of the expansion stretches and throttles can be one of a set of such elements from which the particular element is selected and connected to the other elements.

According to the invention, the elements are connected in cascade in the flow direction although it may be noted that similar assembly may be connected in parallel to one another and can have assembling manifolds at the upstream end of the assembly and collected manifolds at the downstream ends. In each assembly, moreover, one or more of the elements (expansion stretches or throttles) can be connected in parallel to the corresponding elements. The elements of the sets can differ as to cross section, degree of expansion, etc.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
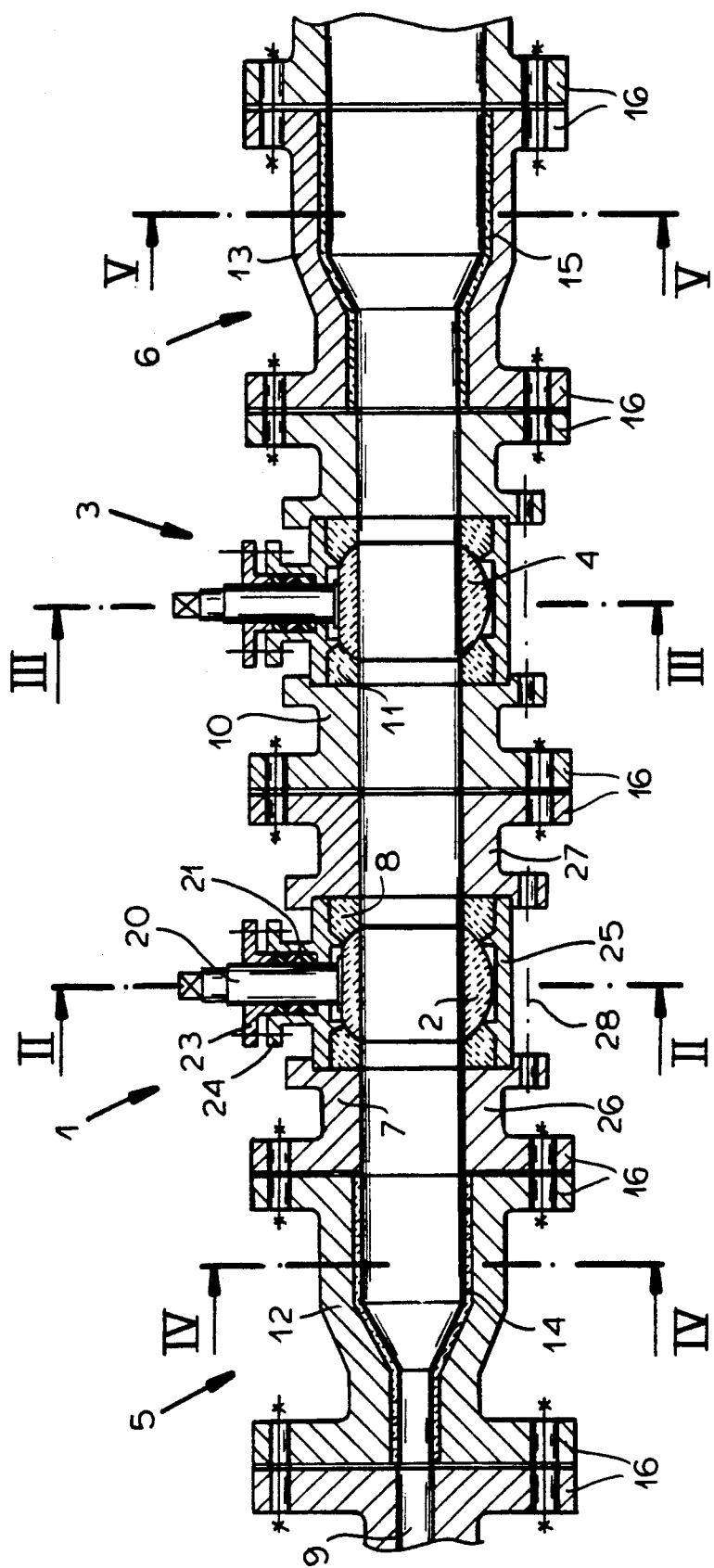
FIG. 1 is an axial cross sectional view through an assembly according to the present invention.
Figure 2:
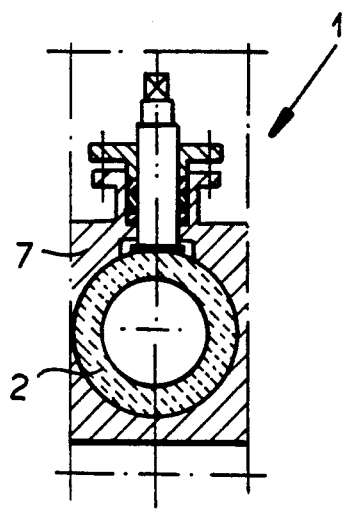
FIG. 2 is a cross sectional view taken along the line II—II of FIG. 1.
Figure 3:
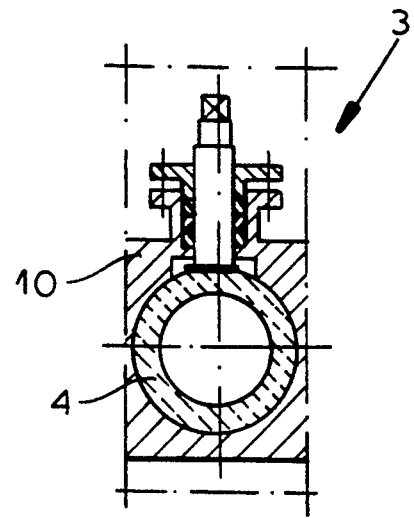
FIG. 3 is a cross sectional view taken along the line III—III of FIG. 1.
Figure 4:
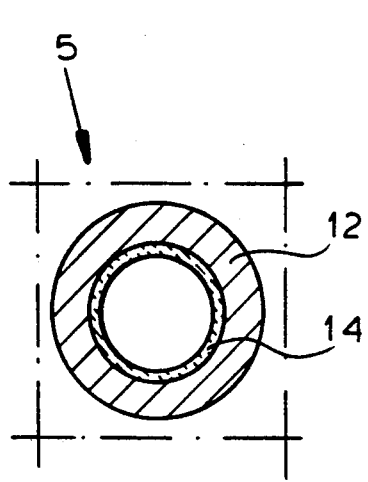
FIG. 4 is a cross sectional view taken along the line IV—IV of FIG. 1.
Figure 5:
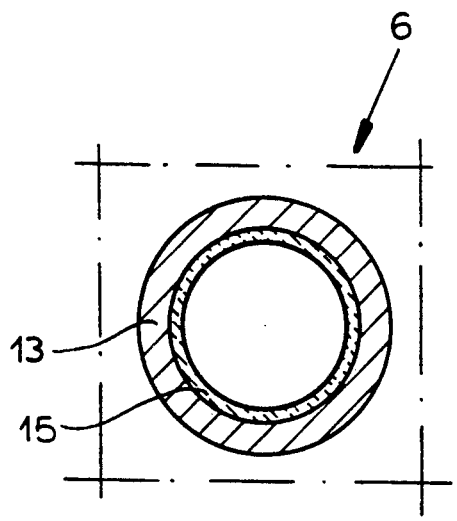
FIG. 5 is a cross sectional view taken along the line V—V of FIG. 1.

The assembly of FIG. 1 comprises a first throttle 1 having a housing or casing or metal as represented at 10 and provided with inserts 8 which define valve seats of the throttle and portions of the flow path along which the median is displaced. The seats 8 and the valve member 2 of the throttle can be composed of an engineered ceramic as described. The member 2 can have a stem 20 which can be actuated by a remote control unit in response to feedback representing the upstream of volume flow rate downstream of the assembly. A gland-type seal 21 can surround the stem 20 and can be held in place by a packing ring 23 engageable in a sleeve 24 of the inner housing member 25 flanked by the outer housing members 26 and 27 held together by tie bolts 1 of which is represented at 28.

The second throttle 3 can have a similar construction as will be apparent.

The expansion stretches 5 and 6 likewise have casings 12 and 13 which are generally nozzle shaped and enlarged flow cross section from the inlet flow cross section 9 at the upstream side of the assembly. These casings 12 and 13 are lined with ceramic inserts 14 and 15.

Figure 6:
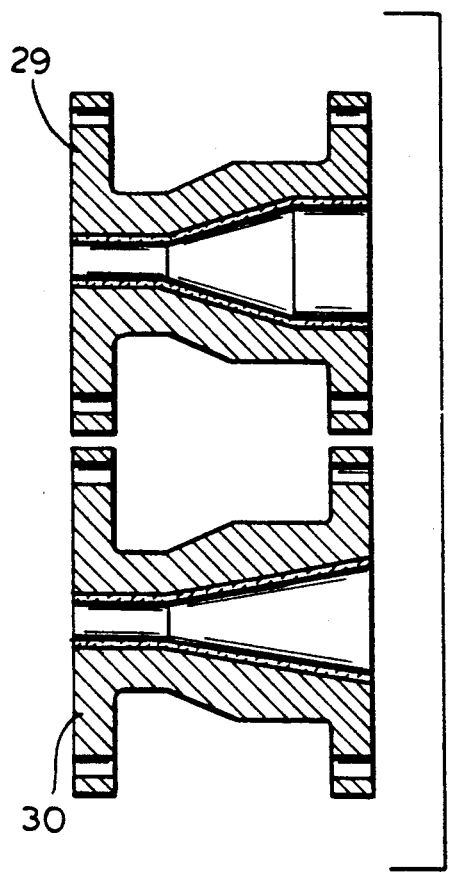
FIG. 6 is a diagram illustrating two additional members of the set of first expansion stretches according to the invention.
Figure 7:
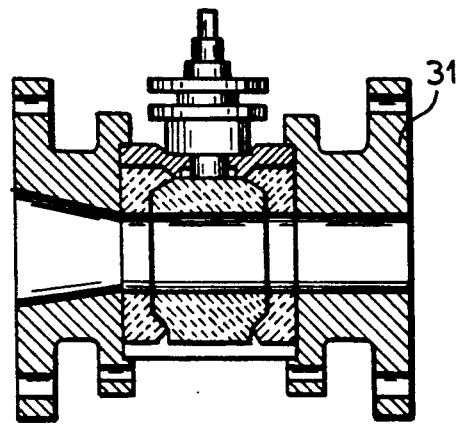
FIG. 7 is a cross sectional view through a throttle which can be another member of the set with which either of the two throttles of FIG. 1 may be associated.
Figure 8:
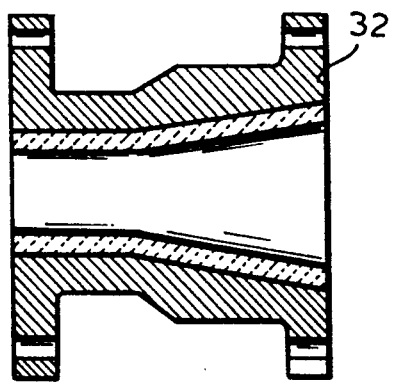
FIG. 8 is a cross sectional view through still another expansion stretch forming a member of the set with which the second expansion stretch of FIG. 1 is associated.

In the embodiment illustrated and in accordance with as preferred embodiment of the invention, the expansion stretch 15 is provided upstream of the first throttle 1 and the second expansion stretch 6 is provided downstream of the second throttle 3, the latter having a housing 10, ceramic inserts 11 defining the seats and the valve member or throttle member 4 which can be rotated by its stem as has been described in connection with the throttle 1. It is also apparent from FIG. 1 that the housing 7, 10, 12 and 13, are formed with connecting elements 16, e.g. coupling layers, for uniting the elements 1, 3, 5 and 6 of the assembly in the series arrangement previously described and also allow each element to be replaced or exchanged. For example in FIG. 6 I have shown two additional expansion elements 29 and 30 of different degrees of expansion and flow cross section which form a set with the expansion stretch 1 of FIG. 1 and which can be selectively substituted for it. In FIG. 7 I have shown a throttle 31 of dimensions different from the throttles 1 and 3 and forming sets therewith so that one member of each of these sets can be selected as desired for incorporation into the assembly. Similarly the expansion stretch 32 of FIG. 8 has a member of a set of such expansion stretches with the stretch 6 so that a member of this set can be selectively incorporated into the assembly.

The inserts 8, 11, 14 and 15 composed of the engineered ceramic, when in place, are under radial compression by the pressure of the flowable medium traversing the system in the flow direction with a main pressurization direction and are thus held in place by the pressure with which these inserts are braced outwardly and against ends of the elements in series with each element. It is also possible to allow some of the medium to bleed behind the inserts so as to pressure relieve them in the casings.

As can be seen from FIG. 1, the elements of the assembly are clamped together in the flow direction and the ceramic inserts are all positioned and oriented so that they are held against movement by assembly of the elements in this manner.

I claim:

1. An assembly for controlling pressure and volumetric flow of a compressible or incompressible medium which can entrain finely divided solids, comprising:
   a first throttle formed with a respective control member actuatable to vary a flow cross section thereof;
   a second throttle downstream of said first throttle and provided with a respective control member to vary a flow cross section of said second throttle, said control members of said first and second throttles having bores formed with respective inner cylindrical surfaces;
   a first expansion segment upstream of said first throttle along a flow of said medium through said assembly affording a flow cross section enlargement for said flow of said medium; and
   a second expansion segment downstream of said second throttle along said flow of said medium and affording a flow cross section enlargement for said flow of said medium, each of said expansion segments being formed with:
   a respective upstream cylindrical inner surface,
   a respective downstream cylindrical surface spaced from the respective upstream cylindrical surfaces, and
   a respective frustoconical surface connecting each upstream cylindrical surface with respective downstream cylindrical surface and widening toward the respective upstream surface, said downstream surface of said first segment and said upstream surface of said second segment lying substantially flush with said inner surfaces of said control members of said first and second throttles,
   at least said first throttle comprising a metal housing and a lining insert in said housing composed of an engineered ceramic, at least one of said control members being composed of an engineered ceramic forming a respective one of said inner cylindrical surfaces,
   said second expansion segment having a flow cross section of said upstream surface greater than a cross section of said upstream surface of said first throttle, both of said expansion segments having nozzle-shaped metal casings and respective inserts conforming to the shape of the respective casings and composed of engineered ceramic.

2. The assembly defined in claim 1 wherein both of said throttles is further provided with a respective pair of valve seats flanking a respective one of said control members and formed with respective inner surfaces lying flush with inner surfaces of said control members, said seats being composed of an engineered ceramic.

3. The assembly defined in claim 2 wherein said segments and said throttles are provided with connectors enabling attachment of said segments and throttles selectively in various optional sequences.

4. The assembly defined in claim 3 wherein said engineered ceramic in said segments and throttles are linings braced by pressure of said medium against respective casings as said medium flows under pressure through said assembly.

5. The assembly defined in claim 3 wherein said engineered ceramic in said segments and throttles are linings so disposed in respective casings that said medium can flow both through and behind said linings whereby said linings are relieved from a pressure of said medium.

6. The assembly defined in claim 3 wherein said first throttle forms one of a set of first throttle units selectively incorporatable in said assembly and differing as to flow cross section and throttle effect.

7. The assembly defined in claim 6 wherein said second throttle forms one of a set of second throttle units selectively incorporatable in said assembly and differing as to flow cross section and throttle effect.

8. The assembly defined in claim 7 wherein said first expansion segment forms one of a set of first expansion segment units selectively incorporatable in said assembly and differing as to expansion effect.

9. The assembly defined in claim 8 wherein said second expansion segment forms one of a set of second expansion segment units selectively incorporatable in said assembly and differing as to expansion effect.

10. The assembly defined in claim 1 wherein both of said expansion segments have nozzle-shaped metal casings and respective inserts conforming to the shape of the respective casings and composed of engineered ceramic.

11. The assembly defined in claim 1 wherein said segments and said throttles are provided with connectors enabling attachment of said segments and throttles selectively in various optional sequences.

12. The assembly defined in claim 1 wherein said engineered ceramic in said segments and throttles are linings braced by pressure of said medium against respective casings as said medium flows under pressure through said assembly.

13. The assembly defined in claim 1 wherein said engineered ceramic in said segments and throttles are linings so disposed in respective casings that said medium can flow both through and behind said linings whereby said linings are relieved from a pressure of said medium.

14. The assembly defined in claim 1 wherein said first throttle forms one of a set of first throttle units selectively incorporatable in said assembly and differing as to flow cross section and throttle effect.

15. The assembly defined in claim 1 wherein said second throttle forms one of a set of second throttle units selectively incorporatable in said assembly and differing as to flow cross section and throttle effect.

16. The assembly defined in claim 1 wherein said first expansion segment forms one of a set of first expansion segment units selectively incorporatable in said assembly and differing as to expansion effect.

17. The assembly defined in claim 1 wherein said second expansion segment forms one of a set of second expansion segment units selectively incorporatable in said assembly and differing as to expansion effect.

* * * * *